(12) United States Patent
Infantini

(10) Patent No.: US 12,127,502 B2
(45) Date of Patent: Oct. 29, 2024

(54) METHOD TO ADJUST THE OPENING BETWEEN THE SHAKERS OF A FRUIT HARVESTER AND A HARVESTING MACHINE

(71) Applicant: CNH Industrial America LLC, New Holland, PA (US)

(72) Inventor: Mauricio Blanco Infantini, Sorocaba (BR)

(73) Assignee: CNH Industrial America LLC, New Holland, PA (US)

( * ) Notice: Subject to any disclaimer, the term of this patent is extended or adjusted under 35 U.S.C. 154(b) by 376 days.

(21) Appl. No.: 17/547,694

(22) Filed: Dec. 10, 2021

(65) Prior Publication Data

US 2022/0095540 A1  Mar. 31, 2022

Related U.S. Application Data

(63) Continuation of application No. PCT/BR2020/050206, filed on Jun. 10, 2020.

(30) Foreign Application Priority Data

Jun. 12, 2019 (BR) .......................... 102019011909-8

(51) Int. Cl.
  *A01D 46/26* (2006.01)
(52) U.S. Cl.
  CPC .................................. *A01D 46/264* (2013.01)
(58) Field of Classification Search
  CPC ............................. A01D 46/264; A01D 46/26
  See application file for complete search history.

(56) References Cited

U.S. PATENT DOCUMENTS 4,063,406 A   12/1977  Burton
4,085,572 A    4/1978  Bruel
            (Continued)

FOREIGN PATENT DOCUMENTS

BR   MU8900750-6 U2   4/2009
BR   102017017031-4 A2   3/2019

OTHER PUBLICATIONS

Translation of the international preliminary report on patentability for PCT/BR2020/050206, filed into the record on Jan. 3, 2022, (Year: 2022).*

(Continued)

*Primary Examiner* — Calvin Cheung
(74) *Attorney, Agent, or Firm* — Peter K. Zacharias; Rebecca L. Henkel; Rickard K. DeMille

(57) ABSTRACT

A method to adjust an opening between a plurality of shakers of a machine formed as a fruit harvester, starting with aligning and centralizing the machine with a crop row to be harvested, includes the steps of: identifying and defining a configuration of a plurality of trees to be harvested; measuring a width of the plurality of trees to be harvested; setting a value for a desired damage level; calculating an opening factor based on the desired damage level defined in the step of setting; determining a distance "X" from the opening between the plurality of shakers, based on a value obtained for the opening factor in relation to the width of the plurality of trees to be harvested; and adjusting the opening between the plurality of shakers according to the distance "X" determined in the step of determining.

17 Claims, 4 Drawing Sheets

(56) References Cited

U.S. PATENT DOCUMENTS

| | | | |
|---|---|---|---|
| 4,418,521 A * | 12/1983 | Orlando | A01D 46/28 |
| | | | 56/330 |
| 4,974,404 A | 12/1990 | Korthuis et al. | |
| 5,339,612 A | 8/1994 | Scott | |
| 5,946,896 A * | 9/1999 | Daniels | A01D 46/264 |
| | | | 56/330 |
| 6,145,291 A | 11/2000 | Jarmain | |
| 6,360,518 B1 * | 3/2002 | Scott | A01D 46/264 |
| | | | 24/274 WB |
| 6,378,282 B1 * | 4/2002 | Carlton | A01D 46/264 |
| | | | 56/330 |
| 9,832,929 B1 * | 12/2017 | Majors | A01D 46/264 |
| 2003/0226345 A1 | 12/2003 | Mendonca Fava et al. | |
| 2005/0252190 A1 | 11/2005 | Scott et al. | |
| 2007/0012018 A1 | 1/2007 | Pellenc et al. | |
| 2008/0060336 A1 | 3/2008 | Bonadeo | |
| 2010/0050585 A1 | 3/2010 | Amaro | |
| 2014/0250854 A1 | 9/2014 | Wendte et al. | |

OTHER PUBLICATIONS

European Search Opinion for Application EP 20821586, filed into the record Jun. 21, 2023, (Year: 2023).*

K.F. Sanders, "Orange Harvesting Systems Review", Biosystems Engineering, vol. 90, Issue 2, 2005, pp. 115-125, ISSN 1537-5110, https://doi.org/10.1016/j.biosystemseng.2004.10.006. (https://www.sciencedirect.com/science/article/pii/S1537511004001977) (Year: 2005).*

WO 2017191316 A1 with English translation, date filed May 5, 2017, date published Nov. 9, 2017. (Year: 2017).*

International Search Report dated Aug. 27, 2020 for International Application No. PCT/BR2020/050206 (4 pages).

Extended European Search Report for EP Application No. 20821586.3 dated Jun. 21, 2023 (11 pages).

* cited by examiner

METHOD TO ADJUST THE OPENING BETWEEN THE SHAKERS OF A FRUIT HARVESTER AND A HARVESTING MACHINE

CROSS REFERENCE TO RELATED APPLICATION

This is a continuation of PCT application No. PCT/EP2020/050206, entitled "METHOD FOR ADJUSTING THE APERTURE BETWEEN SHAKER TOWERS OF A FRUIT HARVESTER AND HARVESTER", filed Jun. 10, 2020, which is incorporated herein by reference. PCT application No. PCT/EP2020/050206 claims priority to Brazilian patent application BR 102019011909-8, filed Jun. 12, 2019, which is incorporated herein by reference.

FIELD OF THE INVENTION

The present invention relates to a novel method to adjust the opening between the shakers of a harvesting machine, particularly for the harvesting of citrus fruits such as oranges, lemons, tangerines, etc. More particularly, the present invention relates to a method of adjustment of the opening between the shakers of a harvester to thereby ensure the proper harvesting of the fruit, but mainly to significantly reduce the risks of causing damage to tree trunks and branches.

Also, the present invention refers to a fruit harvesting machine that includes shakers whose distance is adjusted according to the aforementioned method.

BACKGROUND OF THE INVENTION

According to the more traditional state of the art, the harvesting of citrus fruit crops such as orange and lemon is known to be performed manually, requiring a large number of employees, in addition to longer times needed to harvest the crop with substantially large areas, which restrict the profitability of farmers.

With the technological advances made and in order to improve the productivity and profitability of fruit crops, the machines and equipment were developed with the capacity of executing a mechanized harvest, that is, facilitating and accelerating the harvesting process in crop areas.

However, while they substantially improved the productivity and profitability of the harvesting process, these machines and equipment eventually compromised the following crops. This happened because it was found that the level of aggression caused by these machines, and more particularly by the vibrating and shaking ways responsible for removing the fruit from the branches, eventually damage the trees in a way that significantly reduced the number of fruit and their quality in the next crop, since the trees ended up wasting their energies to recover and not to produce the fruits. In some critical cases, it was found that the work of these machines causing damages that allowed the proliferation of diseases that infected the trees, even causing the death of the trees in some cases.

Thus, due to the negative results observed in the machines used in the past to carry out the mechanized harvest of these fruits, farmers became discouraged from using these technologies.

According to the state of the art, it has been found that one of the main drawbacks of mechanized harvesting for this type of fruit is that the trees have a wide variety of dimensions, especially in terms of width. In addition, it is worth noting that the state of the art already includes tree configurations that have been, to some extent, modified by pruning, or by handling the seedlings, in order to obtain crops configured to attempt to facilitate the mechanized harvest. This type of variety in the configuration of the trees can make the mechanized harvesting process more complex, especially in obtaining an adequate adjustment of the distance between the shakers according to the type of tree and in order to provide conditions that enable the removal of the fruits, but without causing significant damage to trees.

Thus, although the solutions applied to the mechanical harvesting of citrus fruit were efficient in the removal of fruit, what is needed in the art is the capability of reducing the level of aggression with respect to the trees, ensuring productivity in the removal of the fruit, but significantly avoiding and/or reducing the damage caused to the branches and trunks of the trees, in order to ensure the integrity of the trees for the production of the crops.

SUMMARY OF THE INVENTION

Thus, in accordance with the foregoing, the present invention provides a method to adjust the opening between the shakers of a fruit harvester, which has been developed to provide a practical and functional solution to the problems, limitations and disadvantages revealed by the machines and the mechanized harvesting processes known in the state of the art.

More particularly, this invention attempts to provide a method to adjust the opening of the shakers of a citrus fruit harvester which includes technical and functional features which ensure the arrangement of the shakers in conditions suitable to ensure the removal of the fruit, while preventing and/or reducing damage to tree branches and trunks.

Additionally, the present invention provides a citrus fruit harvester which includes shakers which promote fruit removal, and the distance between the shakers is controlled and adjusted by the above-mentioned method.

Thus, in order to obtain the above-described technical and functional effects, among others, the present invention relates to a method to adjust the opening between the shakers of a citrus fruit harvester which includes initially aligning and centralizing the machine with the crop row to be harvested, and then performing the following basic steps:
a) identifying and defining the configuration of the trees to be harvested;
b) measuring the width of the trees to be harvested;
c) setting a value for the desired damage level;
d) calculating the opening factor based on the level of damage defined in the previous step;
e) determining the distance between the shakers, based on the value obtained for the opening factor in relation to the width of the trees to be harvested;
f) adjusting the opening between the shakers according to the distance determined in the previous step.

According to an embodiment of the present invention, the value for the desirable damage level is a percentage of trunk and/or branch breakage by the total number of trunks and/or branches of the tree. Further, according to a particular embodiment of the present method, the value for the desired damage level is a percentage of tree trunk breakage relative to the total number of trees harvested.

According to a further embodiment of the adjustment method of the present invention, during the step (d), said opening factor is calculated based on the type of tree configuration, which may follow the conditions indicated below:

i. if the trees have a traditional configuration, the opening factor will be defined based on a first function (a) which can be represented, for example, by $(D)=3.3714\ e^{-5.117\ (F)}$; or ii. if the trees have a manipulated configuration, the opening factor will be defined based on a second function (β) which can be represented, for example, by $(D)=13.53\ e^{-10.18\ (F)}$.

According to one embodiment of the method of the present invention, said distance between the shakers is determined based on the formula:

$$\text{Opening factor }(F) = \frac{\text{Distance }(X)}{\text{Width }(W)}$$

Also, according to another embodiment of the present invention, the opening between the shakers is determined by the distance that is measured between the inner surfaces of the columns of the shakers.

According to the present invention, the level of damage can range from 2.0% to 25% and more particularly from 2.5% to 20% for trees with a width ranging from 1.5 m to 3.5 m.

According to possible embodiments of the present invention, said opening factor may vary between 0.40 and 0.95, more particularly between 0.50 and 0.95 in the case where the trees are of a traditional configuration, and between 0.40 and 0.65 in the case where the trees are of a manipulated configuration. Also, according to yet another embodiment of the present method, said opening distance between the shakers vary between 0.60 m and 3.30 m.

According to yet another embodiment of the present method of adjustment, in the traditional configuration, said opening distance between the shakers can vary between 0.80 m and 3.30 m, while in the manipulated configuration this opening distance between the shakers can vary between 0.60 m and 2.30 m.

Also, in accordance with yet another embodiment of the present invention, the step (b) related to measuring the width of the trees can be performed with the aid of an analog or digital measuring device provided in the front portion of the machine.

According to yet another possible embodiment of the present invention, said adjustment method is executed in an automated manner according to each tree passing through the opening formed between the shakers and according to the displacement of the harvester along the crop row.

According to a further aspect of the present method, the step (c) related to the determination of the level of damage can be carried out according to the crop conditions, varying based on the state of maturity of the fruits and/or the moment in which the harvest is being carried out.

Furthermore, as mentioned above, the present invention also relates to a fruit harvester, which is a self-propelled fruit harvester including a structure that is moved along the crop rows by way of wheels so that the trees pass through an opening obtained by the arrangement of shakers, which are formed by columns provided with flexible rods, said opening being adjusted according to the distance between the shakers determined by the above-mentioned method.

Finally, according to a particular embodiment of the present invention, said harvester is designed and developed for the harvesting of citrus fruits, such as oranges, tangerines, lemons and their variants.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1A:
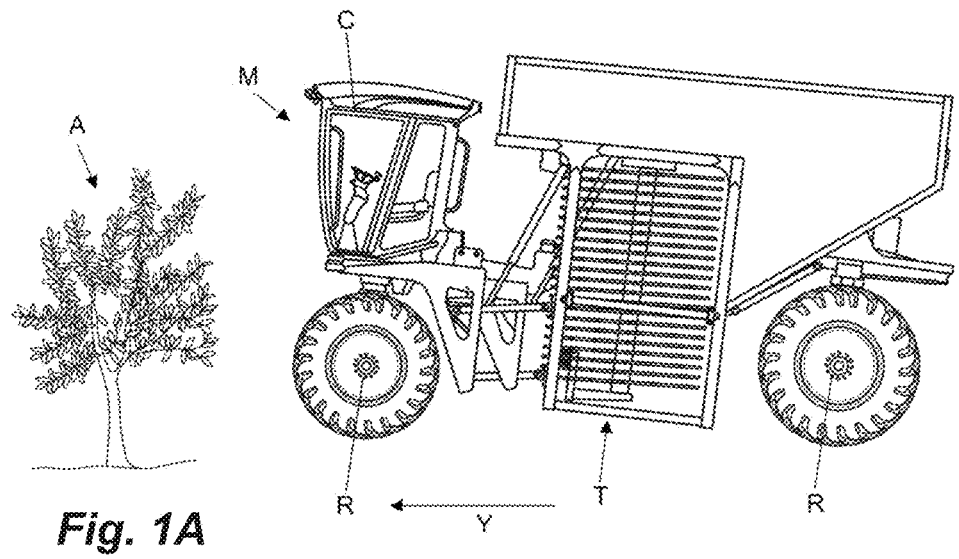
FIGS. 1A and 1B are schematic views of a harvesting machine, such as a citrus fruit harvester, according to the state of the art.
Figure 1B:
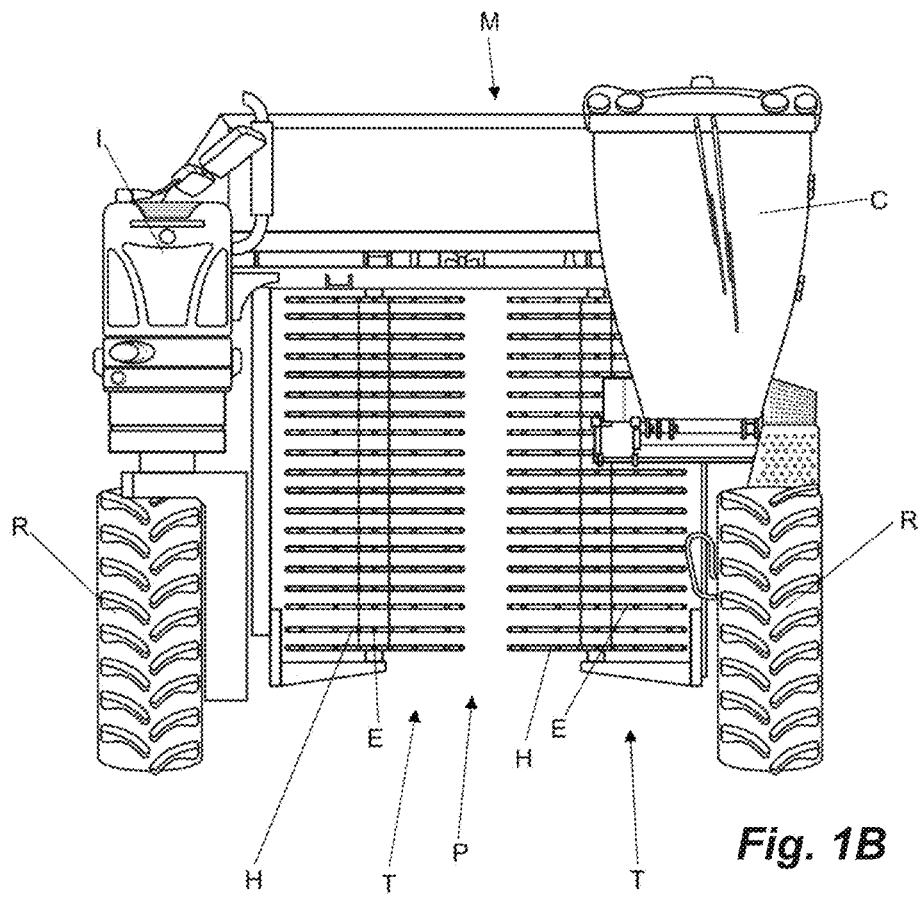

The present invention will now be described with respect to its particular embodiments and with reference to the attached figures as examples of embodiments. Such figures are schematic, and their dimensions and/or proportions may not correspond to reality, since they are merely intended to describe the invention in a didactic manner. In addition, certain known and common constructive details may have been omitted for greater clarity and conciseness of the following description. The reference numerals indicated in the figures are repeated to indicate the same or similar technical characteristics. Terms such as "above", "below", "front", "behind", "right", "left" and their variants should be interpreted according to the orientation given in FIG. 1A.

Although the present description makes reference to orange crops, as should be appreciated by those skilled in the art, the present invention may also be applied to machines for harvesting other citrus fruits, such as, without limitation, lemon, tangerines, etc.

In this context, it is noted that, in general, said harvesting machine (M) can move along the crop rows on wheels (R) in the direction of crop area, as indicated by arrow Y, making the plants, shrubs, trees (A) pass through an opening (P) formed by the shaking mechanisms responsible for vibrating the trees. These shaking mechanisms are formed by shakers (T) which are composed of a column (E) supporting a plurality of flexible rods (H), with each shaker being conventionally designed to rotate about the column so as to orient the trees (A) into the opening (P).

The harvesting machine (M) may be a self-propelled equipment or an equipment made available as an agricultural implement which is pulled by a working vehicle, such as a tractor. In cases where self-propelled equipment is used, as represented in the attached figures, the harvesting machine also includes a cabin (C) with commands so that the operator can adjust the harvesting parameters of the machine, a motor (I) that provides power to drive the mechanical, electrical and hydraulic systems of the harvesting machine (M), and optionally it may also include a reservoir tank to store the fruit prior to its transfer to carts via conveyor mechanisms.

Said shakers (T) are positioned in the harvesting machine so as to form the opening (P) through which the trees enter the machine. Thus, as shown in the figures, this opening (P) is determined by the distance "X", which is the measurement between the inner surfaces of the columns (E) of the shakers (T).

Figure 2A:
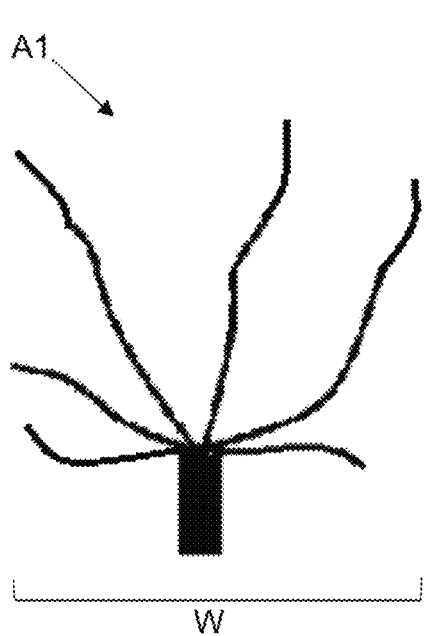
FIGS. 2A and 2B show two types of tree configurations that can be found currently in the field for harvesting.
Figure 2B:
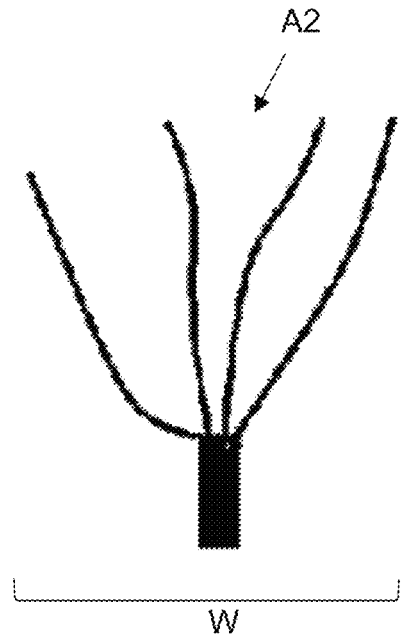
Figure 3:
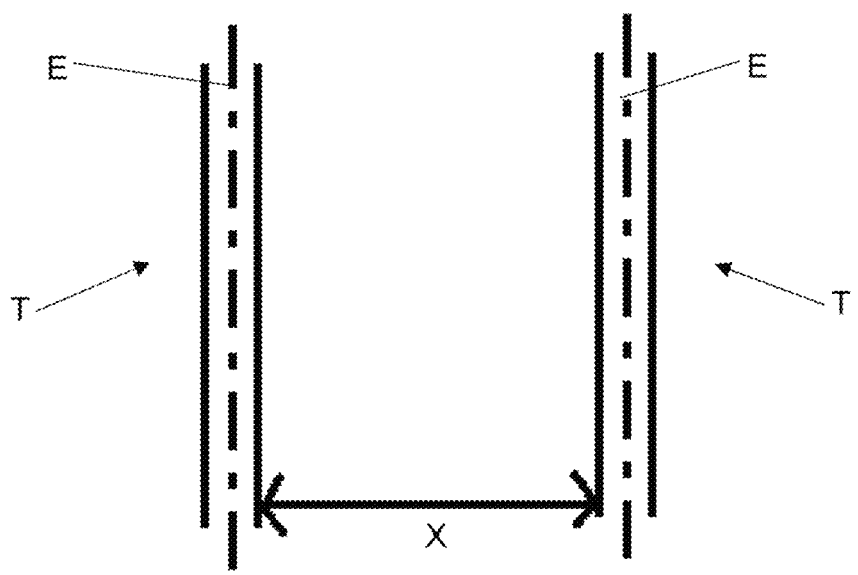
FIG. 3 is a schematic representation of the columns of the shakers of a fruit harvester, which form an opening that can be adjusted according to the method of the present invention.
Figure 4:
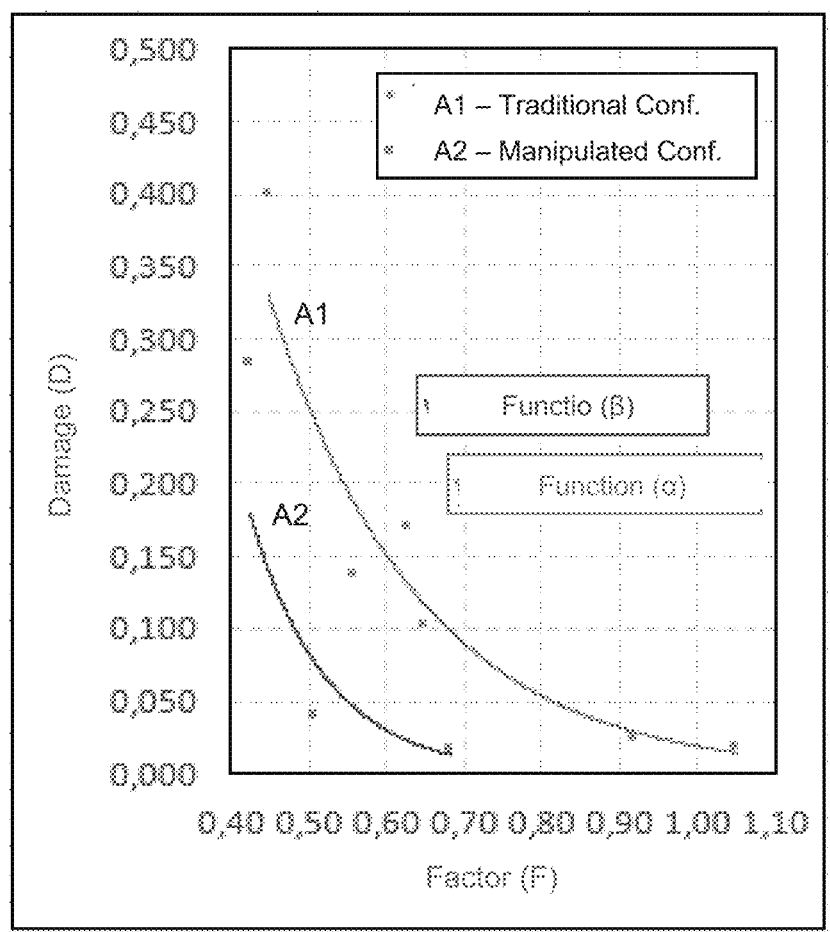
FIG. 4 shows a graph indicating the damage level representations as a function of the opening factor of the shakers according to the method of the present invention, respectively, for the two types of trees configuration.

In addition, the trees (A) usually encountered in the field basically include two configurations, namely: a traditional configuration (A1), which has lower branches and extends laterally; and a manipulated configuration (A2), which has been designed to provide a suitable shape for the mechanized harvests, for example by pruning or manipulation of the seedlings, and has branches that extend only upwardly. FIGS. 2A and 2B show the representations of these two configurations of trees usually found in fruit plantations, as is the case with oranges.

Thus, considering the above summarized scenario, and as indicated in the attached figures, it is possible to state that the method to adjust the opening of the shakers in accordance with the present invention starts with the operator/driver of the harvesting machine (M) positioning the harvester aligned and centralized with the crop row that will be harvested. Thereafter, the method to adjust the opening of the shakers includes, basically, the following steps:

a) identifying and defining the configuration of the trees (A) to be harvested;
b) measuring the width (W) of the trees (A) to be harvested;
c) setting a value for the level of damage (D) that is adequate, desirable and acceptable, according to the conditions of the trees (A) to be harvested and the interests of the operator/driver;
d) calculating the opening factor (F) based on the level of damage (D) set forth in step (c);
e) determining the distance "X" from the opening between the shakers (T), based on the value obtained for the opening factor (F) in relation to the width (W) of the trees (A) to be harvested;
f) adjusting the opening (P) between the shakers (T) according to the distance "X" determined in step (e).

According to a particular embodiment of the present invention, during the step (d), the calculation of the opening factor (F) is obtained based on the following conditions:

i. if the trees (A) have a traditional configuration (A1), said opening factor (F) will be defined from a first function (α); or
ii. if the trees (A) have a manipulated configuration (A2), the opening factor (F) will be defined from a second function (β);
wherein:
the first function (α) is represented by $(D)=3.3714 \ e^{-5.117 \ (F)}$, and
the second function (β) is represented by $(D)=13.53 \ e^{-10.18 \ (F)}$.

In this context, the adjustment of the opening (P) between the shakers (T) is controlled considering the configuration and the width of the trees (A) in order to keep the opening factor (F) relatively constant and, consequently, to ensure the same damage level (D) throughout the harvesting process.

According to one embodiment of the adjustment method of the present invention, said opening factor (F) obtained during said step (d) is calculated by the ratio of the distance (X) between the shakers (T) and the width (W) of the trees (A). More particularly, this opening factor (F) in accordance with the present method can be determined as follows:

$$\text{Opening factor}(F) = \frac{\text{Distance}(X)}{\text{Width}(W)}$$

wherein: the distance "X" is measured between the surfaces of the columns (E) of the shakers (T); and the width (W) is an average of the widths of the trees (A) to be harvested.

Thus, after determining a value for the damage level (D) in the step (d), it is possible to determine the opening factor (F) from the functions (a) or (β) and then apply this opening factor (F) to the aforementioned formula to obtain the distance "X" and determine the proper adjustment of the opening (P) between said shakers (T) using said distance. Also, the value of the opening factor (F) may be inversely proportional to the value of the damage level (D) of the trees (A), i.e., the lower the damage level (D), the greater the opening factor (F) in order to adjust the opening (P) between the shakers (T).

According to the present invention, said damage level (D) of the present adjustment method is determined on the basis of the number of broken trunks and/or branches, and according to particular embodiments of the present adjustment method, this damage level (D), when it is considered to be suitable, desirable and acceptable, may range from 2.0% to 25%, more particularly from 2.5% to 20%. Under these conditions, based on these damage levels (D), on the types of configuration of the trees (A) to be harvested, and considering that the trees vary between 1.5 m and 3.5 m in width, it is possible to determine the respective opening factors (F), which will be as indicated in the Table 1 below:

TABLE 1

| | Opening factor (F) | |
| --- | --- | --- |
| Damage Level (D) | Traditional Configuration (A1) | Manipulated Configuration (A2) |
| 0.025 (2.5%) | 0.92 | 0.63 |
| 0.050 (5%) | 0.82 | 0.54 |
| 0.100 (10%) | 0.68 | 0.48 |
| 0.200 (20%) | 0.54 | 0.42 |

Figure 5A:
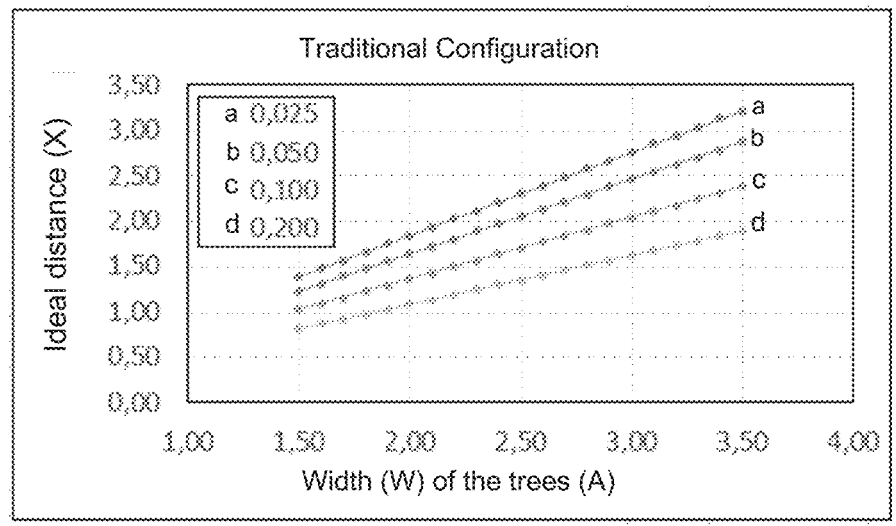
FIGS. 5A and 5B show two graphical plots of exemplary embodiments of the method to adjust the opening between the shakers according to the present invention.
Figure 5B:
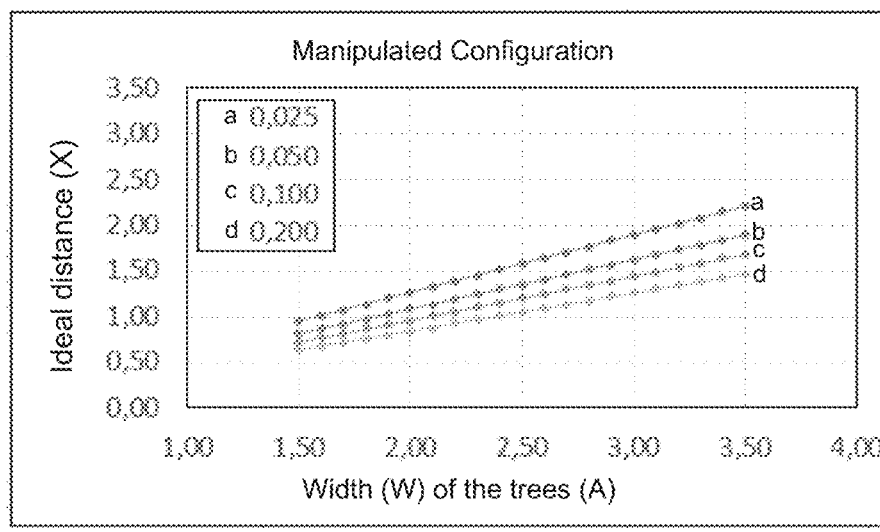

FIGS. 5A and 5B show the graphical plot of the application of these opening factors (F) in calculating the distance "X" of the opening (P) between said shakers, according to the type of configuration and the variation of the width of the trees (A).

According to possible embodiments of the present invention, and particularly considering trees with width (W) ranging from 1.5 m to 3.5 m, the distance "X" of the opening (P) may range from 0.60 m to 3.30 m, whereas in the case of trees with a traditional configuration (A1), this distance "X" may vary particularly between 0.80 m and 3.30 m, while for trees with a manipulated configuration (A2) this distance "X" may vary between 0.60 m and 2.30 m. Of course, it is important to note that these parameters should be interpreted as illustrative data, without restricting the scope of protection of the present invention.

According to a further embodiment of the method to adjust the opening (P) between the shakers (T) of a harvester (M) according to the present invention, the step (b) for measuring the width (W) of the trees (A) can be performed with the aid of an analog or digital measuring device provided in the front portion of the machine, so as to improve the accuracy of calculating the distance "X" of the opening (P) between said shakers and thus provide a productive harvest, while avoiding the risk of substantial damage to the trees (A).

Also, according to another possible embodiment of the present invention, the method to adjust the opening (P) between the shakers (T) of a harvester (M) can be executed in an automated manner, allowing the adjustment of the distance "X" in a timely manner and in accordance with each tree (A) that passes through said opening (P) as said harvester (M) moves along the crop row.

A further important aspect for determining the appropriate, desirable and acceptable damage level (D) according to the step (c) of the method of the present invention may be defined according to crop conditions, for instance, based on the state of maturity of the fruit, that is, whether they are green, ripe, or past their harvestable state. It is also possible to determine the damage level (D) desirable at the time the harvest is being carried out, i.e. at the beginning, middle or end of the harvest period. Such conditions may influence the decision of the damage level (D) desirable, since it determines the interests of the farmer and producer in relation to the necessity and/or possibility of executing a full or partial harvest of the fruits.

As indicated above, the present invention also relates to a harvesting machine (M), such as a self-propelled fruit harvester, formed by a structure capable of moving along the crop rows by way of wheels (R) making it so that the trees (A) pass through an opening (P) obtained by the arrangement of shakers (T), which are formed by columns (E) holding a plurality of flexible rods (H), wherein said opening (P) is adjusted according to the distance "X" determined using the method described above.

According to a particular embodiment of the present invention, said harvesting machine (M) is designed and developed to promote the harvesting of citrus fruits, such as oranges.

Alternatively, the machine is not self-propelled, rather, it is presented in the form of an implement pulled by a tractor.

Thus, based on the above exemplifying description, it is possible to observe that the method to adjust the aperture (P) between the shakers (T) according to the present invention is capable of improving the conditions of operation and execution of the mechanized harvesting process of fruits, especially citrus fruits such as oranges. This is because, according to the method of the present invention, it is possible to adequately and safely adjust the distance "X" using the opening (P) between the shakers, thereby ensuring that the fruit is removed from the branches and, at the same time, ensuring that the damage to the branches and trunks of the trees (A) is within pre-established and acceptable limits, without compromising the quality and productivity of the following harvests.

In an alternative embodiment, the harvesting machine includes a single shaker. In this case, the distance "X" to be calculated must be divided by 2, i.e. equal to X/2, just as the width of the plant also needs be divided by 2, that is, equal to W/2, wherein:

$$F = \frac{\frac{X}{2}}{\frac{W}{2}} = \frac{X}{W}$$

In this way, the opening factor F remains the same, since, F=(X/2)/(W/2)=X/W.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A method to adjust an opening between a plurality of shakers of a machine formed as a fruit harvester, starting with aligning and centralizing the machine with a crop row to be harvested, the method comprising the steps of:
   identifying and defining a configuration of a plurality of trees to be harvested;
   measuring a width of the plurality of trees to be harvested;
   setting a value for a predefined damage level;
   calculating an opening factor based on the predefined damage level defined in the step of setting;
   determining a distance "X" from the opening between the plurality of shakers, based on a value obtained for the opening factor in relation to the width of the plurality of trees to be harvested; and
   adjusting the opening between the plurality of shakers according to the distance "X" determined in the step of determining.

2. The method according to claim 1, wherein the value for the predefined damage level is a percentage of a breaking of at least one of a plurality of trunks and a plurality of branches of the plurality of trees by a total number of at least one of a plurality of trunks and a plurality of branches of the plurality of trees.

3. The method according to claim 1, wherein the value for the predefined damage level is a percentage of a breaking of a plurality of tree trunks by a total number of the plurality of trees to be harvested.

4. The method according to claim 1, wherein during the step of calculating, the opening factor is calculated based on a type of the configuration of the plurality of trees, wherein one of:
   i. if the plurality of trees have a traditional configuration, then the opening factor is defined based on a first function; and
   ii. if the plurality of trees have a manipulated configuration, then the opening factor is defined based on a second function;
   wherein:
      the first function is represented by: the predefined damage level=3.3714 $e^{-5.117 \text{ (the opening factor)}}$, and
      the second function is represented by: the predefined damage level=13.53 $e^{-10.18 \text{ (the opening factor)}}$.

5. The method according to claim 4, wherein the opening factor ranges:
   one of (a) from 0.40 to 0.95, and (b) from 0.50 to 0.95 in a case where the plurality of trees are in the traditional configuration, and
   between 0.40 and 0.65 in a case where the plurality of trees are in the manipulated configuration.

6. The method according to claim 5, wherein in the traditional configuration, the distance "X" varies between 0.80 m and 3.30 m, while in the manipulated configuration the distance "X" varies between 0.60 m and 2.30 m.

7. The method according to claim 1, wherein the distance "X" is determined by the following formula:

$$\text{the opening factor} = \frac{\text{the distance "}X\text{"}}{\text{the width}}.$$

8. The method according to claim 7, wherein the distance "X" from the opening varies between 0.60 m and 3.30 m.

9. The method according to claim 1, wherein the opening between the plurality of shakers determined by the distance "X" is a measurement between a plurality of inner surfaces of a plurality of columns of the plurality of shakers.

10. The method according to claim 1, wherein the predefined damage level ranges one of (a) from 2.0% to 25%, and (b) from 2.5% to 20%, in a case of the plurality of trees with the width varying between 1.5 m and 3.5 m.

11. The method according to claim 1, wherein the step of measuring the width of the plurality of trees is carried out with an aid of one of an analog measuring device and a digital measuring device provided in a front portion of the machine.

12. The method according to claim 1, wherein the method is executed in an automated manner according to each of the plurality of trees passing through the opening during a displacement of the machine along the crop row.

13. The method according to claim 1, wherein the step of setting relative to the predefined damage level is performed according to a plurality of crop conditions, varying on a basis of a maturity status of at least one of a plurality of fruit and a time at which a harvest is being carried out.

14. A harvesting machine, comprising:
an arrangement of a plurality of shakers forming an opening, the plurality of shakers including a plurality of columns and a plurality of flexible rods which are provided on the plurality of columns; and
a structure coupled with the arrangement of the plurality of shakers and configured for being moved along a plurality of crop rows by a plurality of wheels so that a plurality of trees pass through the opening obtained by the arrangement of the plurality of shakers, the opening being adjusted according to a distance "X";
wherein the harvesting machine is configured to:
identify and define a configuration of the plurality of trees to be harvested;
measure a width of the plurality of trees to be harvested with a measuring device;
set a value for a predefined damage level;
calculate an opening factor based on the predefined damage level value;
determine the distance "X" from the opening between the plurality of shakers, based on a value obtained for the opening factor in relation to the width of the plurality of trees to be harvested; and
adjust the opening between the plurality of shakers according to the determined distance "X".

15. The harvesting machine according to claim 14, wherein the harvesting machine is a self-propelled fruit harvester.

16. The harvesting machine according to claim 14, wherein the harvesting machine is configured for harvesting a plurality of citrus fruit.

17. The harvesting machine according to claim 16, wherein the plurality of citrus fruit includes at least one of a plurality of oranges, a plurality of tangerines, a plurality of lemons, and a plurality of variants of at least one of the plurality of oranges, the plurality of tangerines, and the plurality of lemons.

* * * * *